(12) United States Patent
Wakazono (10) Patent No.: US 9,643,205 B2
(45) Date of Patent: May 9, 2017

(54) TIRE LUBRICATOR DEVICE OF TIRE TESTING MACHINE

(71) Applicant: Kobe Steel, Ltd., Hyogo (JP)

(72) Inventor: Takehiko Wakazono, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 222 days.

(21) Appl. No.: 14/246,170

(22) Filed: Apr. 7, 2014

(65) Prior Publication Data

US 2014/0353088 A1  Dec. 4, 2014

(30) Foreign Application Priority Data

Jun. 4, 2013  (JP) ................................. 2013-117885

(51) Int. Cl.
*B05C 1/02* (2006.01)
*G01M 17/02* (2006.01)

(52) U.S. Cl.
CPC ........... *B05C 1/027* (2013.01); *G01M 17/022* (2013.01)

(58) Field of Classification Search
CPC .............................. B05C 1/027; G01M 17/022
USPC ....................................................... 184/101
See application file for complete search history.

(56) References Cited

U.S. PATENT DOCUMENTS

| | | | | |
|---|---|---|---|---|
| 2,537,851 A * | 1/1951 | Pannier | ................ | B41F 31/22 101/367 |
| 3,658,152 A * | 4/1972 | Mueller | ............... | B60C 25/0596 118/233 |
| 3,825,965 A * | 7/1974 | Root | ................ | B60S 3/042 118/318 |
| 4,272,301 A * | 6/1981 | Galbraith | ................ | B60C 25/00 134/123 |
| 4,638,756 A * | 1/1987 | Collmann | .......... | B29D 30/0016 118/215 |
| 4,669,417 A * | 6/1987 | Pederson | ............ | B05B 13/0228 118/305 |
| 4,802,556 A * | 2/1989 | Lauber | ................ | F16N 7/38 104/16 |
| 4,887,651 A * | 12/1989 | Santiago | ................ | B67D 1/04 141/1 |
| 4,958,587 A * | 9/1990 | Fogal, Sr. | .......... | B05B 13/0645 118/206 |
| 5,562,773 A * | 10/1996 | Church | ............... | B05B 13/0228 118/318 |

(Continued)

FOREIGN PATENT DOCUMENTS

| | | |
|---|---|---|
| CN | 201159384 Y | 12/2008 |
| CN | 202192765 U | 4/2012 |

(Continued)

*Primary Examiner* — Michael Riegelman
(74) *Attorney, Agent, or Firm* — Studebaker & Brackett PC (57) ABSTRACT

In order to reliably supply a lubrication liquid to a lubricating brush portion by a simple configuration, a tire lubricator device of a tire testing machine of the present invention includes a lubricating brush portion that contacts a bead portion of a rotating tire and applies a lubrication liquid thereto; a tank that hermetically stores the lubrication liquid therein; a first pipe that connects the tank to the lubricating brush portion so as to supply the lubrication liquid stored in the tank to the lubricating brush portion; and a second pipe that is connected to the tank so as to supply pressurized air into the tank from the outside.

7 Claims, 12 Drawing Sheets

(56) References Cited

U.S. PATENT DOCUMENTS

| | | | | |
|---|---|---|---|---|
| 5,570,813 A * | 11/1996 | Clark, II | ............... | F16N 7/30 |
| | | | | 222/1 |
| 5,642,790 A * | 7/1997 | Kane | ............... | B60C 25/0596 |
| | | | | 118/232 |
| 6,209,684 B1 * | 4/2001 | Kane | ............... | B05C 1/06 |
| | | | | 118/214 |
| 6,520,294 B2 * | 2/2003 | Delmoro | ............ | B29D 30/0633 |
| | | | | 184/20 |
| 7,122,220 B1 * | 10/2006 | Hawkins | ............ | B29D 30/0662 |
| | | | | 427/236 |
| 7,597,759 B1 * | 10/2009 | Delmoro | ............... | B60C 25/132 |
| | | | | 118/214 |
| 2013/0333615 A1 * | 12/2013 | Wakazono | ............. | B65G 37/00 |
| | | | | 118/500 |
| 2014/0251757 A1 * | 9/2014 | Wakazono | ........... | G01M 17/021 |
| | | | | 198/406 |
| 2014/0332348 A1 * | 11/2014 | Wakazono | ............ | B65G 37/00 |
| | | | | 198/586 |
| 2015/0076488 A1 | 3/2015 | Kishi et al. | | |

FOREIGN PATENT DOCUMENTS

| | | |
|---|---|---|
| CN | 202791259 U | 3/2013 |
| JP | 55-063909 A | 5/1980 |
| JP | 08-257460 A | 10/1996 |
| JP | 2006-110524 B2 | 4/2006 |
| JP | 2007-029883 A | 2/2007 |

* cited by examiner

TIRE LUBRICATOR DEVICE OF TIRE TESTING MACHINE

BACKGROUND OF THE INVENTION

Field of the Invention

The present invention relates to a tire lubricator device of a tire testing machine.

Description of the Related Art

Hitherto, a rotation test has been performed while a tire is attached to a rim of a tire testing machine when the tire needs to be tested. However, in order to smoothly attach and detach the tire to and from the rim, a lubrication liquid (lubricant) is applied to a bead portion of a tire as a test subject. The application of the lubrication liquid is performed in a tire lubricator device provided in the tire testing machine.

For example, a tire lubricator device disclosed in Japanese Patent Application Laid Open No 8-257460 includes a conveying unit that conveys a tire in a predetermined direction while the tire is placed thereon so that the shaft center of the tire faces the vertical line, a positioning unit that positions the tire at a predetermined position of the conveying unit, a rotation unit that rotates the tire about the shaft center thereof while the tire is positioned at the position, and an application unit that applies a lubricant to a bead portion of the rotating tire. The application unit includes an application roller that applies the lubricant to the bead portion of the tire. In a case where the application is performed, the application roller is moved upward so as to be inserted into a center hole of the tire, and then the application roller is pressed along the horizontal direction so that the lubricant may be applied to the bead portion of the tire rotated by the rotation unit.

Further, a tire lubricator device disclosed in Japanese Patent No 4426940 is adapted to apply the lubricant to the bead portion of the tire by pressing the application roller moved upward by the operation of an elevation air cylinder against the bead portion of the tire as illustrated in FIG. 2 or 5 of the same patent document.

SUMMARY OF THE INVENTION

Although not illustrated in two patent documents above in detail, the tire lubricator device of the tire testing machine usually includes a liquid pump that supplies the lubrication liquid (the lubricant) stored in a tank to a lubricating brush portion. Accordingly, the lubrication liquid stored in the tank is suctioned by using the liquid pump, the lubrication liquid is supplied to the lubricating brush portion, and the lubricating brush portion is pressed against the bead portion of the tire, thereby applying the lubrication liquid thereto.

As described above, the tire lubricator device of the tire testing machine of the related art needs to be provided with the liquid pump that suctions the lubrication liquid from the tank, and hence the configuration of the tire lubricator device becomes complicated due to the installation of these components.

Further, the liquid pump that is used in the tire lubricator device of the tire testing machine of the related art is expensive, and hence increases a burden in economical cost. Further, there is a concern that the cost (the tire manufacturing cost) for performing the tire test may increase.

The present invention is made in view of the above-described problems, and an object thereof is to provide a tire lubricator device of a tire testing machine capable of reliably supplying a lubrication liquid to a lubricating brush portion by a simple configuration and hence simply and reliably applying the lubrication liquid to a bead portion of a tire.

In order to solve the above-described problems, the present invention employs the following technical means.

According to an aspect of the present invention, there is provided a tire lubricator device of a tire testing machine including: a lubricating brush portion that contacts a bead portion of a rotating tire and applies a lubrication liquid thereto; a tank that hermetically stores the lubrication liquid therein; a first pipe that connects the tank to the lubricating brush portion so as to supply the lubrication liquid stored in the tank to the lubricating brush portion; and a second pipe that is connected to the tank so as to supply pressurized air into the tank from the outside.

Desirably, the first pipe may be provided with an adjustment valve that adjusts a flow amount of the lubrication liquid.

Desirably, the second pipe may be provided with a pressure control device that controls a pressure of the pressurized air.

According to the tire lubricator device of the tire testing machine of the present invention, the lubrication liquid may be reliably supplied to the lubricating brush portion in a simple configuration, and hence the lubrication liquid may be simply and reliably applied to the bead portion of the tire.

DESCRIPTION OF THE PREFERRED EMBODIMENTS

A tire lubricator device 4 of a tire testing machine 1 according to the present invention and a method of applying a lubrication liquid (lubricant) L to a bead portion B of a tire T as a test subject using the tire lubricator device 4 will be described with reference to the drawings.

The tire testing machine 1 that is provided in the tire lubricator device 4 will be described in detail before the description of the tire lubricator device 4 of the present invention.

Furthermore, the present invention has a feature in the technique according to the device (the tire lubricator device 4) that applies the lubrication liquid L to the bead portion B of the tire T, and the employed tire testing machine 1 is not limited. A uniformity measurement tire testing machine 1 may be used or a dynamic balance measurement tire testing machine 1 may be used. Further, the tire testing machine 1 that is configured by the combination thereof may be also used.

Figure 1:
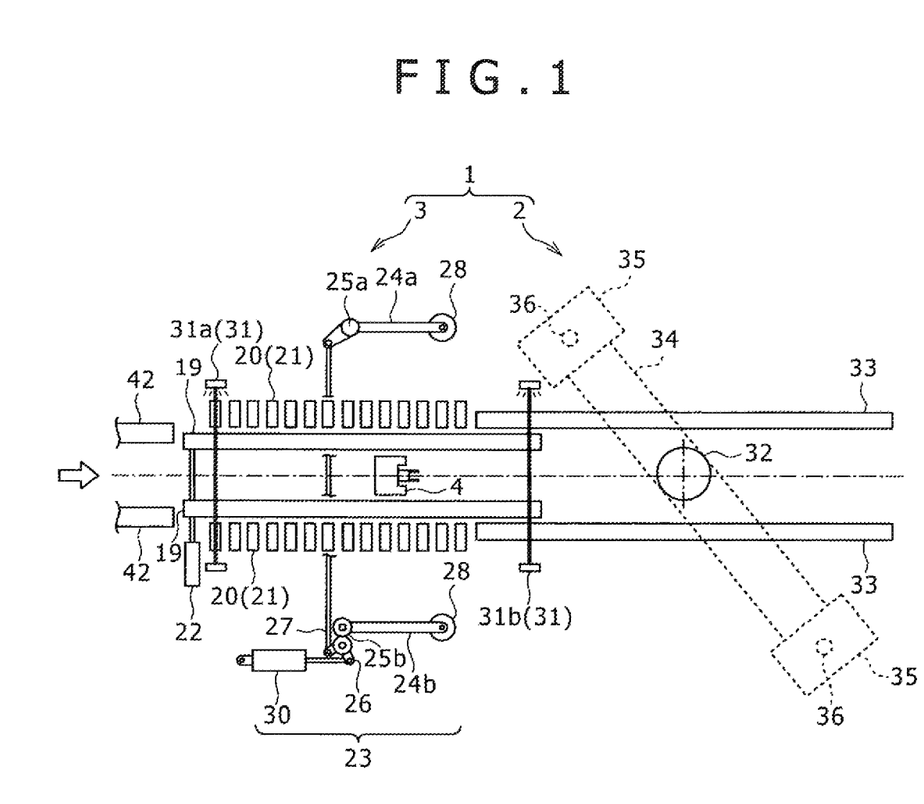
FIG. 1 is a top view of a tire testing machine provided with a tire lubricator device of the present invention.

FIG. 1 is a top view of the tire testing machine 1 provided with the tire lubricator device 4 according to the present invention. Furthermore, on the assumption that the right and left direction of the drawing paper of FIG. 1 is set to the rear and front direction of the tire testing machine 1, the tire T as the test subject is conveyed from the left side toward the right side on the drawing paper of FIG. 1. The up and down direction of the drawing paper of FIG. 1 is set as the left and right direction of the tire testing machine 1 (the up side of the drawing paper of FIG. 1 is set as the left side of the tire testing machine 1, and the down side of the drawing paper of FIG. 1 is set as the right side of the tire testing machine 1). The penetration direction of the drawing paper of FIG. 1 is set as the up and down direction of the tire testing machine 1 (the front side of the drawing paper of FIG. 1 is set as the upside of the tire testing machine 1, and the rear side of the drawing paper of FIG. 1 is set as the downside of the tire testing machine 1).

Figure 2:
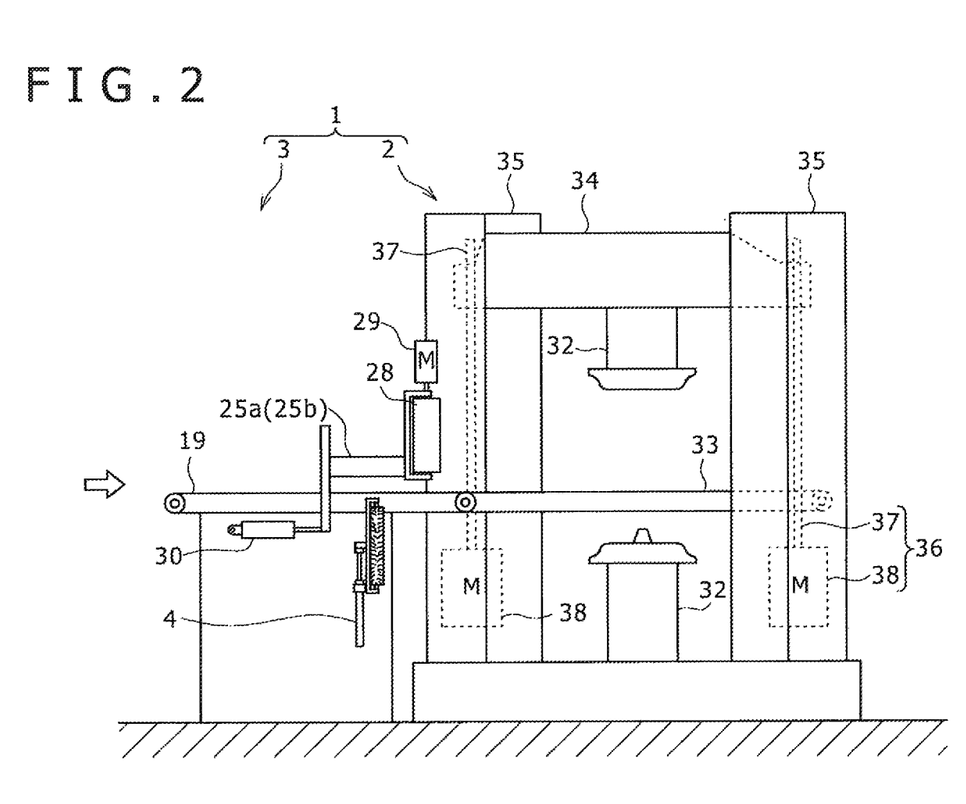
FIG. 2 is a side view of the tire testing machine provided with the tire lubricator device of the present invention.

As illustrated in FIGS. 1 and 2, the tire testing machine 1 provided with the tire lubricator device 4 of the present invention includes a tire testing device 2 which tests the tire T as the test subject and a conveying station 3 through which the tire T is conveyed to the tire testing device 2.

The tire testing device 2 includes a pair of upper and lower spindle shafts 32 that attach the tire T as the test subject so that the tire T is rotatable about the shaft center in the vertical direction and rotationally drive the tire T attached thereto, a slide beam 34 that supports the upper spindle shafts 32 in a suspended manner, a guide frame 35 that guides the slide beam 34 supporting the upper spindle shaft 32 in the up and down (vertical) direction, an elevation unit 36 (for example, a ball screw 37 and an elevation motor 38) that elevates the slide beam 34 supporting the upper spindle shaft 32 in the vertical direction, and a pair of left and right first belt conveyors 33 that is disposed between the pair of upper and lower spindle shaft 32 and conveys the tire T from the conveying station 3 to the pair of upper and lower spindle shafts 32.

The conveying station 3 is provided with a pair of left and right second belt conveyors 19 that conveys the tire T as the test subject toward the tire testing device 2 and a pair of left and right free roller conveyors 20 that rotates the tire T, and these conveyors are laid horizontally.

For example, the free roller conveyors 20 are formed so that free rollers 21 rotatable about the shaft center facing the right and left direction are arranged in parallel in the horizontal direction and the tire T placed on the free roller conveyors 20 moves horizontally in a laid state.

The pair of left and right second belt conveyors 19 is provided on the further inner side of the pair of left and right free roller conveyor 20 so as to follow the free roller conveyors 20. The second belt conveyors 19 are formed so that endless belts are wound along the free roller conveyors 20. Since the endless belts are wound, the tire T that is placed on the second belt conveyors 19 and the free roller conveyors 20 may be conveyed forward in the horizontal direction.

One side (the right side in FIG. 1) of the second belt conveyor 19 is provided with a driving unit (a driving motor) 22 that drives the second belt conveyors 19. The driving unit 22 is disposed so that a drive shaft 22a is connected to the pair of left and right second belt conveyors 19, and the drive shaft 22a simultaneously drives the pair of left and right second belt conveyors 19.

Further, the conveying station 3 is provided with handling mechanism 23 that hold the tire T while the tire T rotates about the vertical shaft center thereof in order to apply the lubrication liquid L to the bead portion B of the conveyed tire T.

The handling mechanisms 23 move holding rollers 28 from two directions, that is, the front left direction and the front right direction toward the tire T placed on the free roller conveyors 20 in a laid state and press the outer peripheral surface of the holding rollers 28 against the outer peripheral surface (the tread surface) of the tire T, so that the tire T is held at a predetermined position on the free roller conveyors 20 and the second belt conveyors 19.

Specifically, each handling mechanism 23 includes a left arm member 24a which is long at the left side of the left free roller conveyor 20 and a right arm member 24b which is long at the right side of the right free roller conveyor 20, and a holding roller 28 is provided in the front end of each of the left arm member 24a and the right arm member 24b. Both holding rollers 28 are attached so as to be rotatable about the shaft facing the up and down direction, and are rotationally driven by holding roller driving units 29 (which are disposed above the holding rollers 28 in FIG. 2).

Further, swinging units (swing air cylinders) 30 are provided so as to swing the left arm member 24a and the right arm member 24b in the right and left direction. Each of the left arm member 24a and the right arm member 24b is an elongated member that has a length which is substantially a half of the free roller conveyor 20.

The left arm member 24a includes a rotation shaft portion 25a that is provided at the slightly rear side of the half portion, and is pivoted by the rotation shaft portion 25a so as to be rotatable about the shaft center in the up and down direction. Further, the rear side (the rear end) of the rotation shaft portion 25a in the left arm member 24a is bent toward the free roller conveyor 20, and is connected to an elongated rod 27.

The rear end of the right arm member 24b is provided with a rotation shaft portion 26b, and the right arm member 24b is pivoted by the rotation shaft portion 25b so as to be rotatable about the shaft center in the up and down direction. The rear end of the right arm member 24b is connected with a link member 26, and receives a driving force from the swinging unit 30 by the link member 26. The link member 26 is connected with the rod 27, and the left arm member 24a also receives the driving force from the swinging unit 30. That is the right arm member 24b and the left arm member 24a are interlocked with each other through the rod 27.

These two arm members 24a and 24b both horizontally swing on the free roller conveyors 20 so as to rotate about the rotation center facing the up and down direction. Then, the holding rollers 28 which are provided in the front ends of the arm members 24a and 24b contact the outer peripheral surface of the tire T with the swinging movement of two arm members, so that the tire T is held at the position. At this time, the tire T rotates about the vertical shaft by the rotational driving forces of the holding rollers 28. Then, when the lubrication liquid L is completely applied to the bead portion B of the tire T the holding rollers 28 are separated from the outer peripheral surface of the tire T so that the tire T is released from the position.

Further, a tire outer diameter calculating unit 31 is disposed in the conveying station 3, Non-contact sensors 31a and 31b are respectively disposed at the tire introduction side and the tire discharge side of the conveying station 3. In this embodiment, each of the non-contact sensors 31a and 31b is configured as a photoelectric sensor (an optical cutting sensor) that emits a line laser beam and measures the tire T based on the reflected beam.

In a case where the outer diameter of the tire T is calculated, the outer diameter is calculated based on the distance between the tire introduction side photoelectric sensor ala and the tire discharge side photoelectric sensor 31b of the conveying station 3, the passage time of the tire T between the tire introduction side photoelectric sensor 31a and the tire discharge-side photoelectric sensor 31b of the conveying station 3, and the speed of the second belt conveyor 19.

As illustrated in FIGS. 1 and 2, the conveying station 3 is provided with the tire lubricator device 4 that applies the lubrication liquid L to the bead portion B of the rotating tire T.

The tire lubricator device 4 is disposed between the pair of left and right second belt conveyors 19. Further, the tire lubricator device 4 is accommodated at a place below the conveying surface of the tire T on the free roller conveyor 20 in a case where the tire lubricator device 4 does not perform a lubrication operation, and is moved upward to the conveying surface of the tire Tin a case where the lubrication operation is performed.

Hereinafter, a configuration of the tire lubricator device 4 of the tire testing machine 1 of the present invention will be described in detail based on FIGS. 3 and 4.

Figure 3:
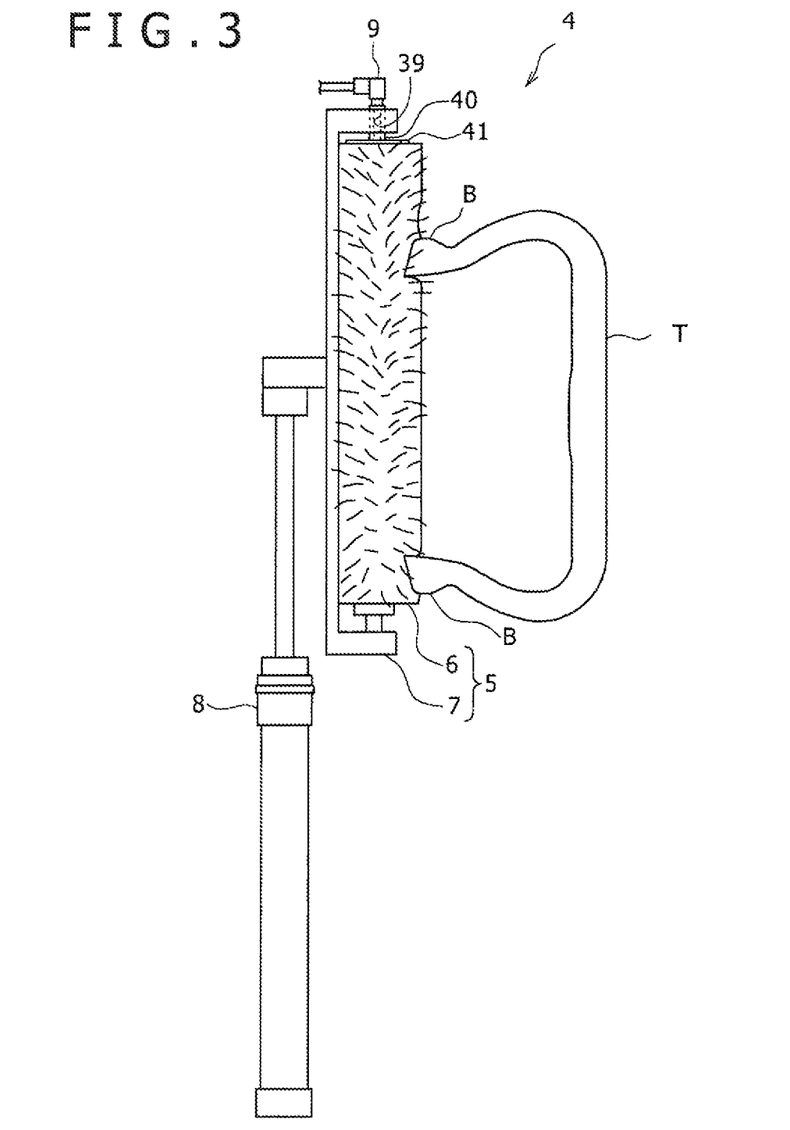
FIG. 3 is a side view illustrating a positional relation between a tire and a lubricating brush portion of the tire lubricator device of the present invention.

FIG. 3 illustrates a structure of the tire lubricator device 4 in a state where a lubricating brush portion 5 contacts the tire T. FIG. 4 illustrates a configuration of the tire lubricator device 4 of the tire testing machine 1 of the present invention.

Figure 4:
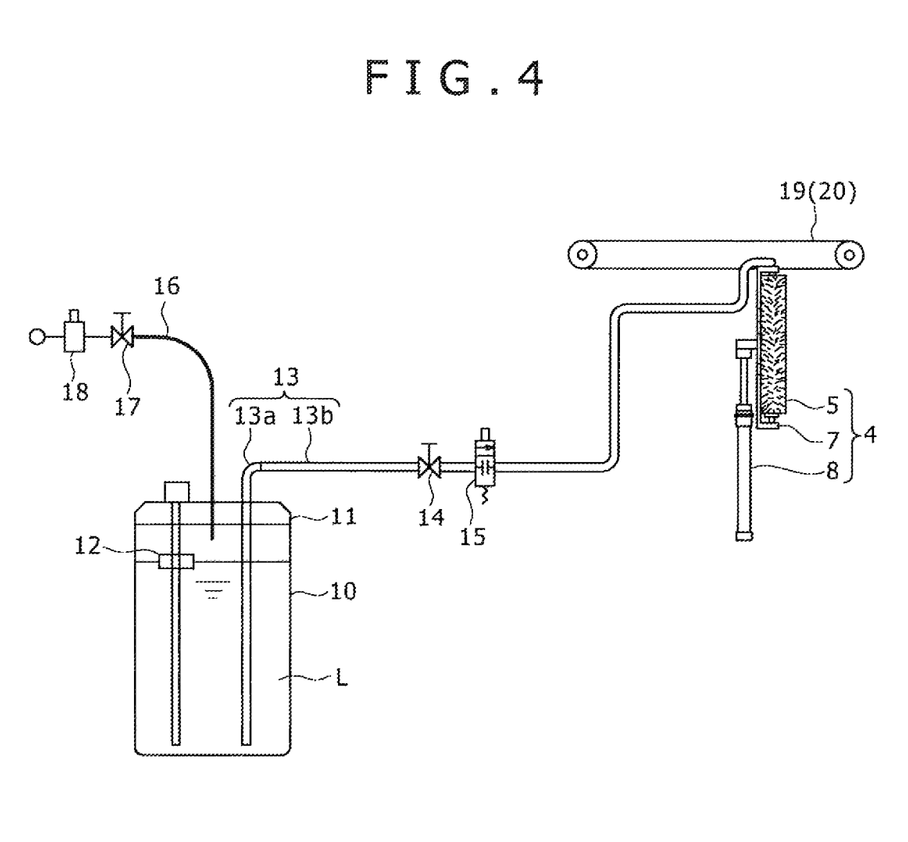
FIG. 4 is a view illustrating the tire lubricator device of the tire testing machine according to the present invention.

As illustrated in FIGS. 3 and 4, the tire lubricator device 4 of the tire testing machine 1 of this embodiment includes the lubricating brush portion 5 that contacts the bead portion B of the tire T rotating about the vertical shaft center and applies the lubrication liquid L thereto, a tank 10 that stores the lubrication liquid L, and a first pipe 13 that connects the tank 10 to the lubricating brush portion 5 and supplies the lubrication liquid L stored in the tank 10 to the lubricating brush portion 5. In addition, an elevation air cylinder 8 is provided so as to elevate the lubricating brush portion 5 in the up and down direction. The lubricating brush portion 5 includes a brush body 6 that is formed in a cylindrical shape so as to rotate about the shaft facing the up and down direction, a brush frame 7 that rotatably supports the brush body 6 so as to rotate about the shaft facing the up and down direction, and a supply portion 9 that supplies the lubrication liquid L to the brush body 6.

The brush body 6 includes an elongated cylindrical body in the up and down direction, and brush bristles that smear the lubrication liquid L on the surface of the tire T are implanted in the outer peripheral surface of the cylindrical body. The center of the brush body 6 is provided with a penetration hole 39 that penetrates the brush body 6 in the up and down direction. A shaft is inserted into the penetration hole 39 in the up and down direction, and the brush body 6 is rotatably supported by the shaft.

The brush frame 7 is a member that is obtained by bending an elongated rectangular plate, facing the front and rear direction and erected in the up and down direction, so that the upper and lower ends of the rectangular plate face the front side.

The upper and lower ends of the brush frame 7 are respectively provided with bearing portions 40 that support the shaft of the brush body 6 so as to be rotatable about the vertical shaft center (the lower side is not illustrated in FIG. 3), and the brush body 6 is supported by the brush frame 7 so as to be rotatable about the vertical shaft center. In this way, the brush body 6 is rotatably supported by the brush frame 7, the lubrication liquid L may be applied to the bead portion B of the tire T by the rotation of the brush body 6.

The supply portion 9 supplies the lubrication liquid L from the tank 10 storing the lubrication liquid L to the brush body 6. The supply portion 9 includes a disk-shaped spraying member 41 that sprays the lubrication liquid L disposed at the upper side of the brush body 6, and the lubrication liquid L is instilled into the brush bristles through the spraying member 41. The supply portion 9 is connected with the first pipe 13 that supplies the lubrication liquid L from the tank 10 storing the lubrication liquid L to the lubricating brush portion 5.

As illustrated in FIG. 4, the first pipe 13 connects the tank 10 and the supply portion 9 to each other and supplies the lubrication liquid L stored in the tank 10 to the brush body 6 of the lubricating brush portion 5. The first pipe 13 includes a derivation pipe 13a that derives the lubrication liquid L stored in the tank 10 to the outside of the tank 10 and a transfer pipe 13b that is connected to one front end of the derivation pipe 13a and transfers the derived lubrication liquid L to the lubricating brush portion 5.

Desirably, the first pipe 13 may be provided with an adjustment valve that adjusts the flow amount (the ejection amount) of the lubrication liquid L. As the adjustment valve, a needle valve 14 or an electromagnetic valve 15 of which the ON/OFF state may be controlled is used. Further, a configuration may be employed in which both the needle valve 14 and the electromagnetic valve 15 are disposed, the flow amount of the lubrication liquid L is adjusted by the needle valve 14, and the ON/OFF state is controlled by the electromagnetic valve 15.

The tank 10 is called an air-tight tank (hereinafter, referred to as an air-tight tank) having air-tightness. The upper portion of the air-tight tank 10 is opened, and the air-tight cover 11 is attached thereto. The residual amount of the lubrication liquid L stored in the air-tight tank 10 is detected by a float-type residual amount sensor 12 disposed inside the air-tight tank 10.

In a case where the residual amount of the lubrication liquid L stored in the air-tight tank 10 is notified to an operator, for example, when the amount of the lubrication liquid L inside the air-tight tank 10 is lower than a predetermined lower-limit value, the residual amount sensor 12 notifies (alarms) this state to the operator.

Further, the maximum lower-limit value (the state where the lubrication liquid L is substantially empty) of the amount of the lubrication liquid L and the lower-limit value (the state where the lubrication liquid L is close to the empty state) are provided. When the lubrication liquid L inside the air-tight tank 10 is lower than the lower-limit value, a preliminary alarm for the operator is generated so as to cause the operator to inject the lubrication liquid L into the air-tight tank 10. Meanwhile, when the lubrication liquid L inside the air-tight tank 10 is lower than the maximum lower-limit value, the tire testing machine 1 is stopped.

The air-tight tank 10 is connected with a second pipe 16 to which pressurized air is supplied from the outside.

The second pipe 16 is attached to the upper portion of the air-tight tank 10, that is, the air-tight cover 11, and supplies the pressurized air into the air-tight tank 10 from the outside. The supplied air is, for example, pressurized air or the like flows through a pipe disposed inside a factory. The second pipe 16 is provided with a manual valve 17 that adjusts the flow amount of the pressurized air from the outside and a regulator 18 that controls the pressure of the pressurized air.

The manual valve 17 normally pressurizes the inside of the air-tight tank 10 when the flow amount of the pressurized air from the outside is decreased while opening the air-tight cover 11, the lubrication liquid L is inserted into the air-tight tank 10, and the air-tight cover 11 is closed. Further, the inside of the air-tight tank 10 may be pressurized only at a necessary timing by using an electromagnetic valve 43 instead of the manual valve 17.

The regulator 18 controls the pressure of the pressurized air and controls the outflow of the lubrication liquid L by changing the pressurized state inside the air-tight tank 10. The regulator 18 that controls the pressure of the pressurized an may be a regulator that fixes a pressure value in advance and controls the pressure of the pressurized air based on the pressure value or an electropneumatic regulator that may change the pressure of the pressurized air by an electric signal.

When the air-tight tank 10 is pressurized by the control of the manual valve 17 and the regulator 18, the lubrication liquid L stored in the air-tight tank 10 is transferred to the lubricating brush portion 5 through the first pipe 13 by the pressure state of the air-tight tank 10.

Hereinafter, a sequence of applying the lubrication liquid L to the bead portion B of the tire T using the tire lubricator device 4 of the tire testing machine 1 of the present invention will be described.

Figure 5:
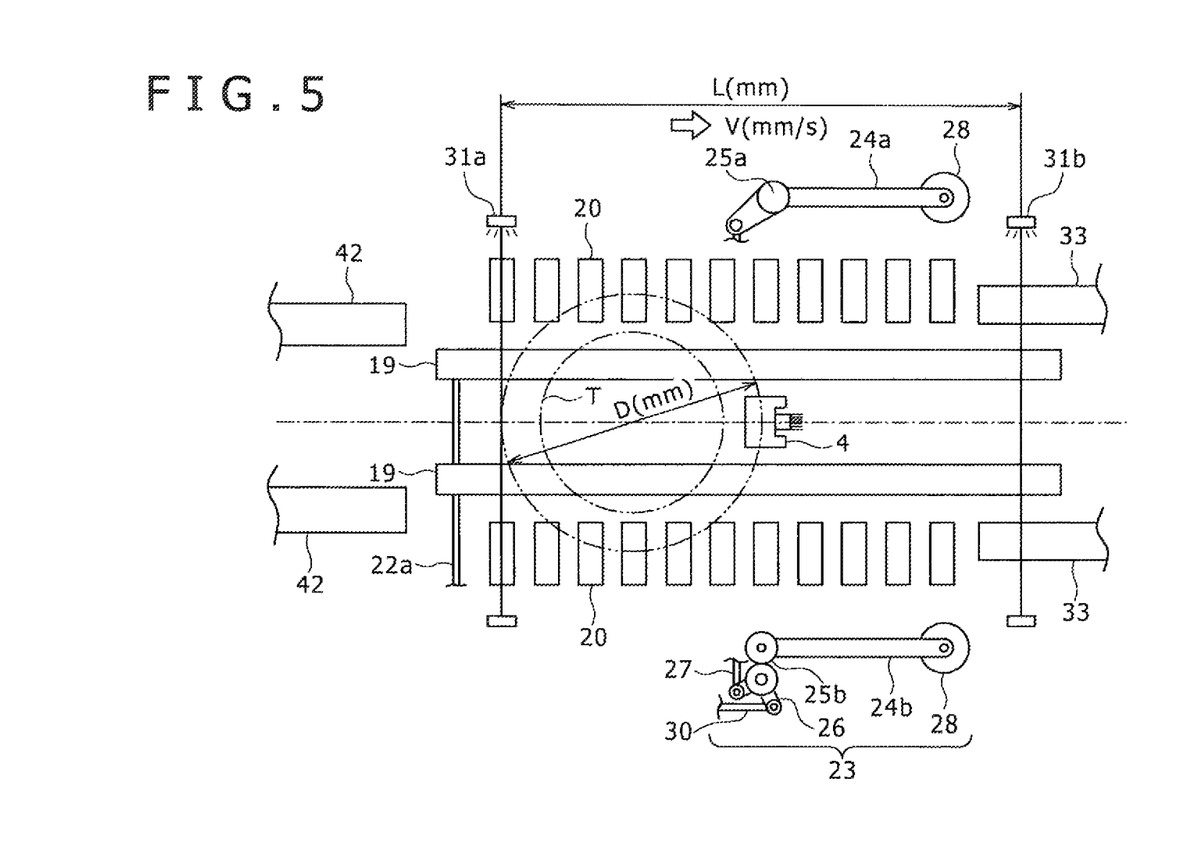
FIG. 5 is a view illustrating a process in which a tire as a test subject is conveyed to a conveying station.

As illustrated in FIG. 5, the pair of arm members provided in the conveying station 3 is opened, and a space (a space between the left arm member 24a and the right arm member 24b) where the tire T conveyed from the upstream third belt conveyor 42 may exist is ensured on the second belt conveyors 19 and the free roller conveyors 20.

When the tire T is conveyed from the upstream third belt conveyor 42 to the space between the left arm member 24a and the right arm member 24b of the second belt conveyor 19, the passage time of the tire T is recorded by the tire outer diameter calculating unit 31. Specifically, in a case where the tire T is introduced onto the second belt conveyor 19, the tire outer diameter calculating unit 31 records the time at which the upstream side (set as the rear end of the outer diameter of the tire T) of the outer diameter of the tire T passes by the laser beam of the tire introduction side photoelectric sensor 31a. This time is set as T1 (second).

Figure 6:
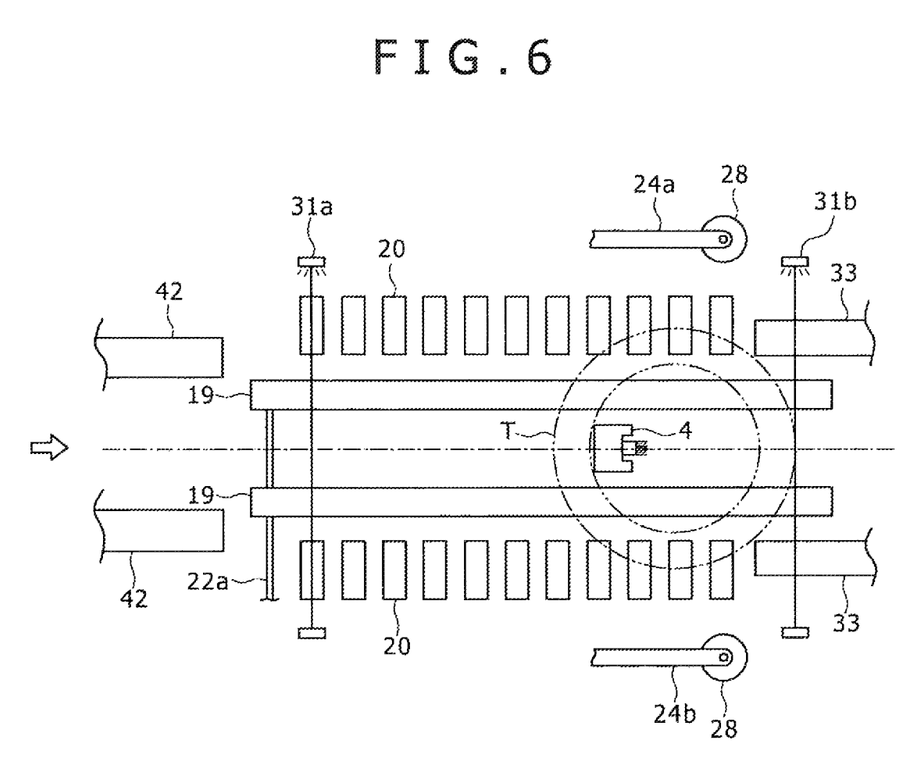
FIG. 6 is a view illustrating a state where the tire as the test subject is conveyed to the conveying station and is disposed at the position of the tire lubricator device.

As illustrated in FIG. 6, when the tire T is conveyed by the second belt conveyor 19 to the space between the left arm member 24a and the right arm member 24b, the tire outer diameter calculating unit 31 records the time at which the downstream side (set as the front end of the outer diameter of the tire T) of the outer diameter of the tire T contacts the laser beam of the tire discharge-side photoelectric sensor 31b and the tire T is stopped. This time is set as T2 (second). Furthermore, the distance between two photoelectric sensors 31a and 31b is denoted by L (mm), and the conveyor speed is set as V (mm/s).

With the above-described configuration, the outer diameter D (mm) of the tire T is calculated by applying the measurement result of the passage time of the tire T to the equation (1).

$$D=L-(T2-T1)\times V \quad (1)$$

Furthermore, in a case where the outer diameter of the tire T is calculated, the movement distance (mm) of the endless belt of the second belt conveyor 19 may be calculated between the time T1 (second) at which the rear end of the outer diameter of the tire T passes by the tire introduction side photoelectric sensor 31a and the tune T2 (second) at which the front end of the outer diameter of the tire T passes by the tire discharge-side photoelectric sensor 31b even when the speed of the second belt conveyor 19 is not uniform. For example, a configuration may be employed in which the number of pulses of an encoder of the driving unit (the driving motor) 22 is counted and the movement distance (mm) of the endless belt of the second belt conveyor 19 may be calculated from an increase in number of pulses between T1 (second) and T2 (second).

Figure 7:
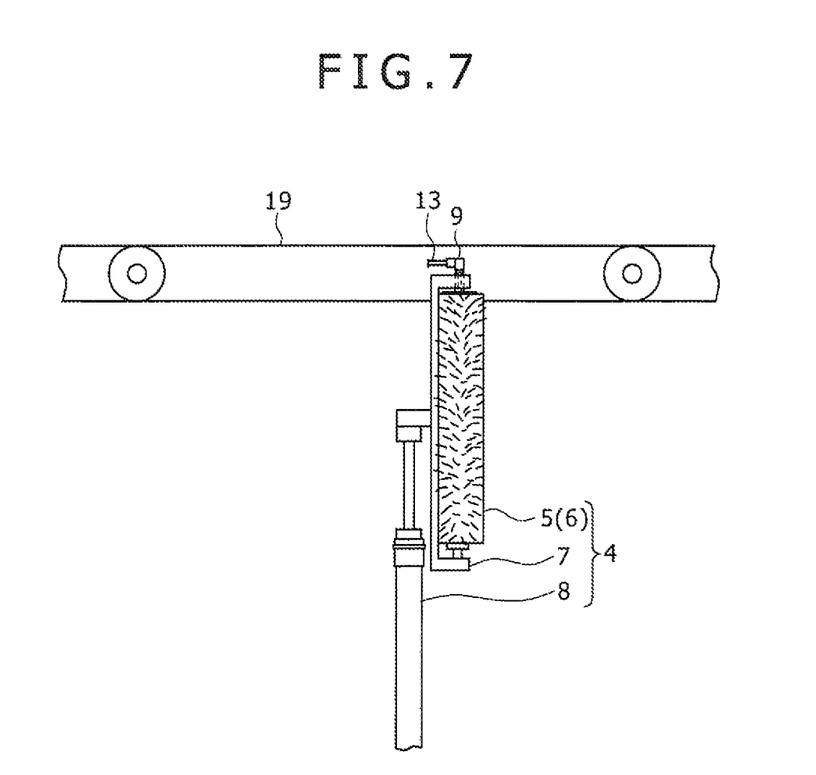
FIG. 7 is a side view illustrating the position of the lubricating brush portion in the state of FIG. 6.

The lubricating brush portion 5 of the tire lubricator device 4 is formed so as to move to a position within the inner diameter (the vicinity of the bead portion B) of the tire T. Further, as illustrated in FIG. 7, the lubricating brush portion is accommodated at a position lower than the conveying surface of the second belt conveyor 19. At this time, the elevation air cylinder 8 of the tire lubricator device 4 is contracted.

Figure 9:
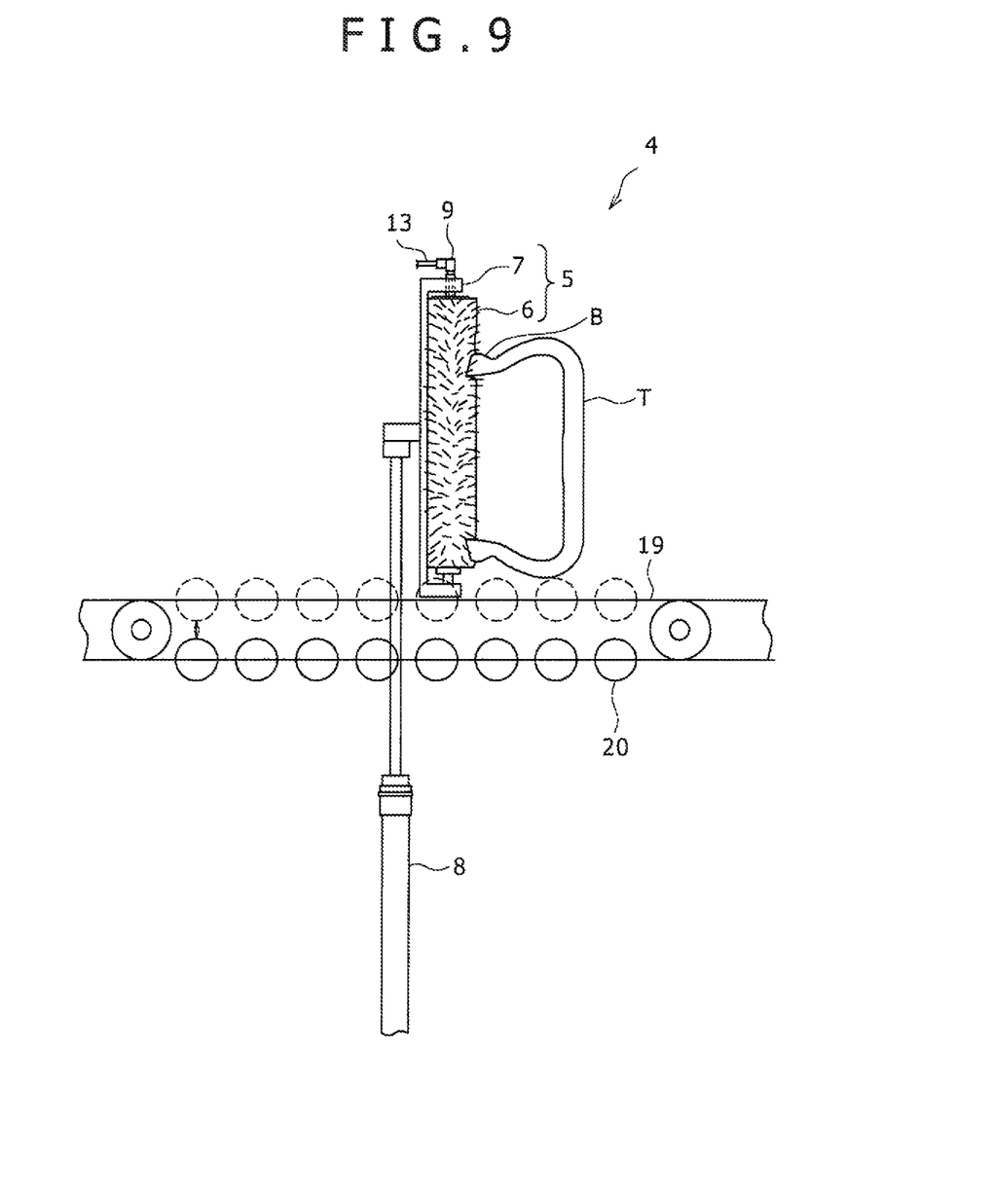
FIG. 9 is a side view illustrating the position of the lubricating brush portion in the state of FIG. 8.

As illustrated in FIG. 9, the lubricating brush portion 5 is moved upward by the extension of the elevation air cylinder 8. Subsequently, the placement place of the tire T is changed from the second belt conveyor 19 to the free roller conveyor 20. After the free roller conveyor 20 is moved upward, indicated as dotted lines in FIG. 9, the left arm member 24a and the right arm member 24b are closed. Accordingly, the arm members are pulled until the bead portion B contacts the surface of the brush body to while the tire T slides on the free roller conveyor 20.

At this time, the pressurized air is introduced into the air-tight tank 10, so that the pressure inside the air-tight tank 10 increases. Accordingly, the lubrication liquid L is ejected from the first pipe 13 so as to correspond to an increase in pressure. The ejected lubrication liquid L is instilled into the brush body 6 of the lubricating brush portion 5.

Then, when the bead portion B of the tire T and the lubricating brush portion 5 contact each other by the left arm member 24a and the right arm member 24b and the bead portion B of the tire T is pressed against the lubricating brush portion 5, the holding roller 28 is driven by the holding roller driving unit 29 so that the tire T rotates.

When the tire T starts to rotate by the holding roller 28, the lubrication liquid L is applied to the bead portion B of the tire T by the lubricating brush portion 5.

Figure 8:
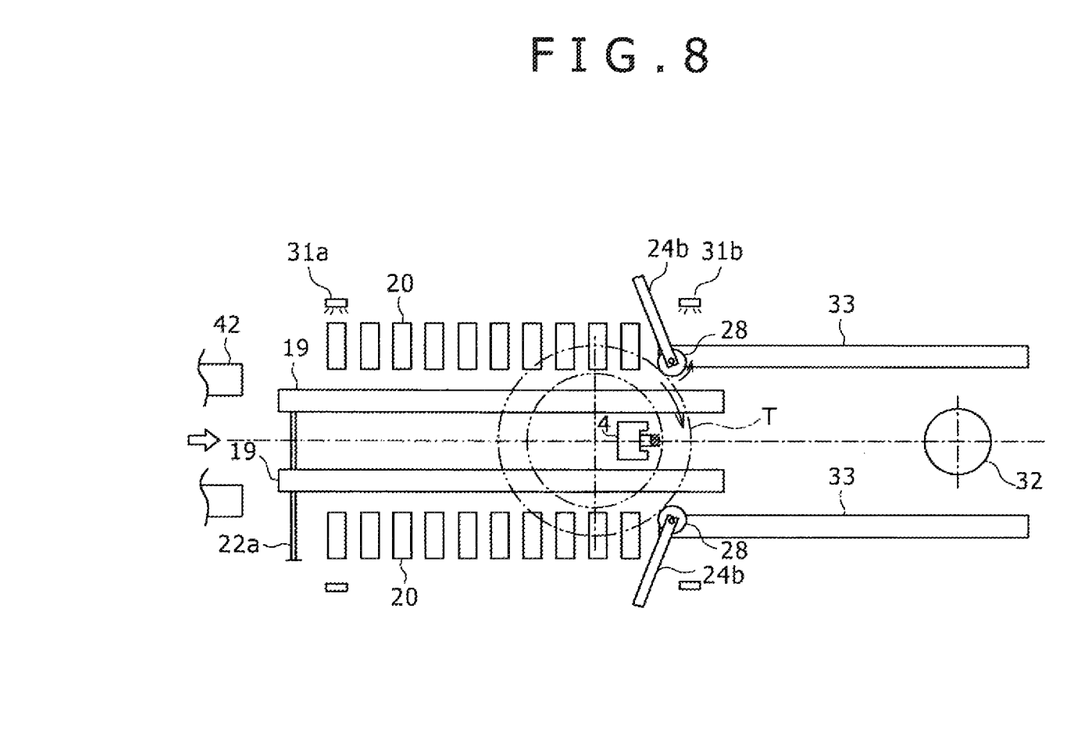
FIG. 8 is a view illustrating a process in which a lubrication liquid is applied to a bead portion of the tire as the test subject.

At this time, as shown in FIG. 8, the shaft center of the tire T is held on the line connecting the centers of the lubricating brush portion 5 and the spindle shaft 32 on the tire testing device 2 by the pair of arm members 24a and 24b. Accordingly, in a case where the tire T is conveyed by the second belt conveyor 19 to the tire testing device 2, the shaft center of the tire T may be aligned to the spindle shaft 32 only by the adjustment of the transfer amount of the tire T, and hence there is no need to perform a centering operation of the tire testing device 2 and the tire T.

Figure 10:
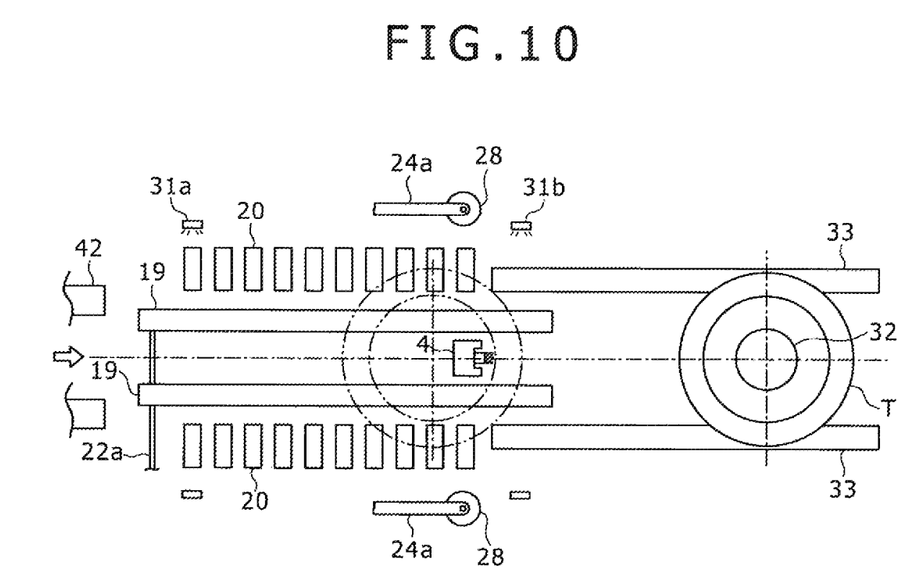
FIG. 10 is a view illustrating a process in which the lubrication liquid is applied to the bead portion of the tire and a tire test is performed.

As illustrated in FIG. 10, when the lubrication liquid L is applied to the bead portion B of the tire T, the pair of arm members 24a and 24b is opened, and the pair of free roller conveyor 20 is moved downward, so that the tire T is placed on the second belt conveyor 19 again. In this state, the tire T is moved toward the tire testing device 2 until the downstream side (referred to as the front end of the outer diameter of the tire T) of the outer diameter of the tire T contacts the laser beam of the tire discharge-side photoelectric sensor 31b, and the elevation air cylinder 8 is contracted so that the lubricating brush portion 5 moves down.

As described above, the tire lubricator device 4 of the tire testing machine 1 of the present invention may reliably supply the lubrication liquid L to the lubricating brush portion 5 in a simple configuration with the air-tight tank 10 and the second pipe 16 having a simple pressurizing unit, and hence the lubrication liquid L may be simply and reliably applied to the bead portion of the tire T.

Further, since the adjustment valve (the needle valve 14 or the electromagnetic valve 15) for adjusting the ejection amount of the lubrication liquid L is provided between the air tight tank 10 and the lubricating brush portion 5, an appropriate amount of the lubrication liquid L may be supplied to the lubricating brush portion 5.

Further, since the tire lubricator device 4 of the tire testing machine 1 of the present invention is provided with the second pipe 16 through which pressurized air is supplied into the air-tight tank 10 from the outside, air inside a factory may be used, and hence the tire test cost may be suppressed.

Incidentally, the present invention is not limited to the above-described embodiment, and the shapes, the structures, the materials, and the combinations of the components may be appropriately modified without departing from the spirit of the present invention. Further, in the embodiment disclosed herein, the detailed content which is not apparently disclosed, for example, the operation condition, the working condition, various parameters, and the dimension, the weight, and the volume of the component are set to values which may be easily supposed by the general person skilled in the art without departing from the application scope of the general person.

Figure 11:
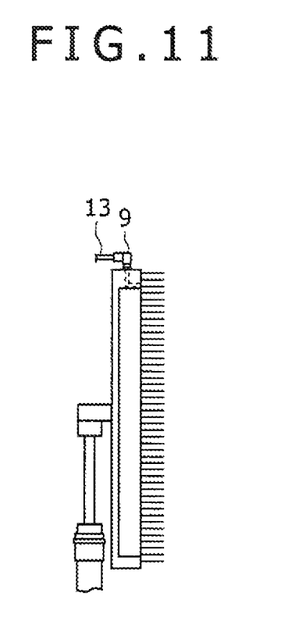
FIG. 11 is a side view (another embodiment) illustrating the position of the lubricating brush portion in the state of FIG. 6.

For example, the above-described brush body 6 is formed in a cylindrical shape so that the brush bristles are implanted into the entire periphery thereof, but the brush bristles may be implanted in a toothbrush shape toward the tire bead portion B (another embodiment is illustrated in FIG. 11). The material of the brush bristles may be nylon, pig bristles, and the other various fiber-like members. Further, instead of the brush, a sponge-like material impregnated with the lubrication liquid may be formed in a cylindrical shape.

Figure 12:
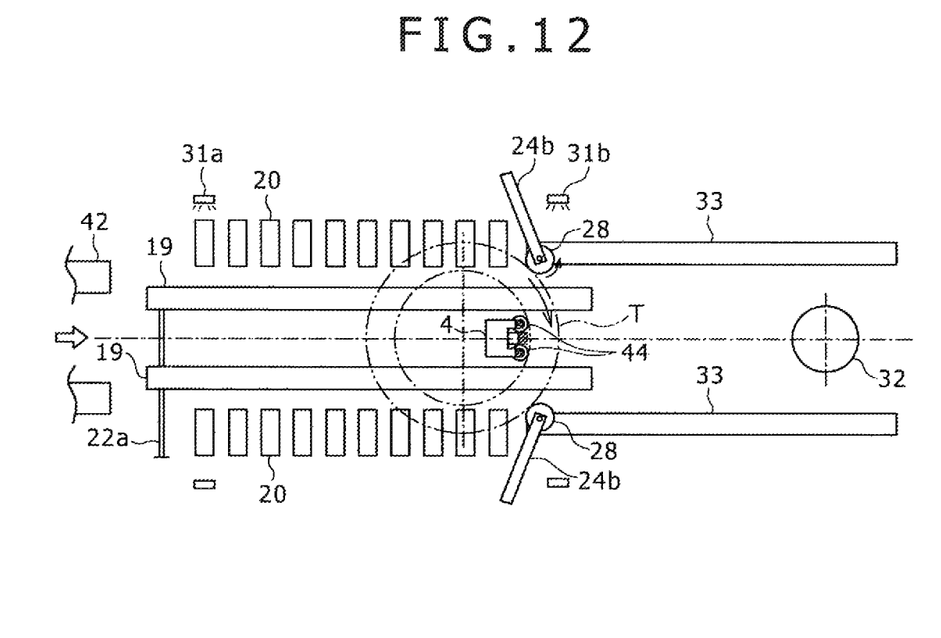
FIG. 12 is a side view (another embodiment) illustrating the position of the lubricating brush portion in the state of FIG. 8.

Further, when two rollers 44 extending in the vertical direction are disposed at both sides of the tire lubricator device 4, the rotation of the tire may be further stabilized on the brush (another embodiment is illustrated in FIG. 12).

What is claimed is:

1. A tire lubricator device of a tire testing machine comprising:
    a lubricating brush portion that contacts a bead portion of a rotating tire and applies a lubrication liquid thereto;
    a tank that hermetically stores the lubrication liquid therein;
    a first pipe that connects the tank to the lubricating brush portion so as to supply the lubrication liquid stored in the tank to the lubricating brush portion;
    a second pipe that is connected to the tank so as to supply pressurized air into the tank; and
    a pair of holding rollers provided to be in contact with outer peripheral surface of the tire to drive the tire to rotate around its central axis thereof such that the holding rollers are in contact with the outer periphery of the tire within a half circumference side of the tire in top view,
    wherein the lubricating brush portion is positioned within said half circumference side when the lubricating brush portion is in contact with the bead portion of the tire and applies the lubrication liquid thereto.

2. The tire lubricator device of the tire testing machine according to claim 1, wherein the first pipe is provided with an adjustment valve that adjusts a flow amount of the lubrication liquid.

3. The tire lubricator device of the tire testing machine according to claim 1, wherein the second pipe is provided with a pressure control device that controls a pressure of the pressurized air.

4. The tire lubricator device of the tire testing machine according to claim 1, wherein the lubricating brush portion has a top end portion in a vertical direction and the first pipe has one end connected to the tank and other end connected to the top end portion of the lubricating brush portion.

5. The tire lubricator device of the tire testing machine according to claim 4, wherein the lubricating brush portion includes a brush body formed in a cylindrical shape, a brush frame that rotatably supports the brush body and a supply portion that supplies the lubrication liquid supplied from the tank to the brush body where the supply portion is directly connected to the other end of the first pipe.

6. The tire lubricator device of the tire testing machine according to claim 5, wherein the supply portion is provided with a spraying member that sprays the lubrication liquid to the brush body.

7. A tire lubricator device of a tire testing machine comprising:
    a lubricating brush portion that contacts a bead portion of a rotating tire and applies a lubrication liquid thereto;
    a tank that hermetically stores the lubrication liquid therein;
    a first pipe that connects the tank to the lubricating brush portion so as to supply the lubrication liquid stored in the tank to the lubricating brush portion;
    a second pipe that is connected to the tank so as to supply pressurized air into the tank; and
    a plurality of roller conveyors on which the tire is placed and conveyed to a conveying direction;
    a pair of holding rollers provided to be in contact with outer peripheral surface of the tire conveyed over the roller conveyors and drive the tire to rotate around its central axis thereof such that the holding rollers are in contact with the outer periphery of the tire within a half circumference side of the tire in the conveying direction,
    wherein the lubricating brush portion is positioned within said half circumference side when the lubricating brush portion is in contact with the bead portion of the tire and applies the lubrication liquid thereto.

* * * * *